United States Patent [19]
Mikitka

[11] Patent Number: 5,219,187
[45] Date of Patent: Jun. 15, 1993

[54] PIPE CONNECTION

[75] Inventor: Peter Mikitka, Edmonton, Canada

[73] Assignee: Tuboscope, Inc., Houston, Tex.

[21] Appl. No.: 692,596

[22] Filed: Apr. 29, 1991

[51] Int. Cl.[5] .............................................. F16L 55/00
[52] U.S. Cl. ........................................ 285/55; 285/21; 285/286
[58] Field of Search ...................... 285/55, 21, 286, 41

[56] References Cited

U.S. PATENT DOCUMENTS

| | | |
|---|---|---|
| 1,810,825 | 6/1931 | Furrer . |
| 1,842,298 | 1/1932 | Smith . |
| 1,903,315 | 4/1933 | Priebe . |
| 1,934,065 | 11/1933 | Hermanson . |
| 2,646,995 | 7/1953 | Thompson .......................... 285/286 |
| 3,325,191 | 6/1967 | Yates . |
| 3,508,766 | 4/1970 | Kessler et al. ................... 285/286 X |
| 3,614,375 | 10/1971 | Becker . |
| 3,798,407 | 3/1974 | Becker . |
| 3,965,555 | 6/1976 | Webster et al. .................. 285/55 X |
| 4,134,529 | 1/1979 | Hara et al. . |
| 4,296,300 | 10/1981 | Bottiglia . |
| 4,357,745 | 11/1982 | Chlebowski . |
| 4,510,171 | 4/1985 | Siebert . |
| 4,681,349 | 7/1987 | Press et al. . |
| 4,865,356 | 9/1989 | Moore et al. ........................... 285/55 |
| 5,001,320 | 3/1991 | Conley et al. .................... 285/55 X |

FOREIGN PATENT DOCUMENTS

| | | | |
|---|---|---|---|
| 677561 | 6/1939 | Fed. Rep. of Germany ...... | 285/286 |
| 691269 | 5/1940 | Fed. Rep. of Germany ...... | 285/286 |
| 677567 | 4/1942 | Fed. Rep. of Germany ........ | 285/55 |
| 1288381 | 1/1969 | Fed. Rep. of Germany ........ | 285/55 |
| 795605 | 3/1936 | France ............................... | 285/286 |
| 848476 | 9/1960 | United Kingdom ................. | 285/55 |
| 973784 | 10/1964 | United Kingdom ................. | 285/55 |
| 1022510 | 3/1966 | United Kingdom ................. | 285/286 |

*Primary Examiner*—Dave W. Arola
*Attorney, Agent, or Firm*—Finnegan, Henderson, Farabow, Garrett & Dunner

[57] ABSTRACT

A pipe connection having a protective interior coating, with the integrity thereof being maintained during assembly of the pipe connection by welding. This is achieved by the use of a heat deflecting material that prevents damage to the interior coating from heat generated incident to welding at the weld-affected zone. During assembly of the pipe connection, mating, coacting compressible materials are brought into engagement and thereby compressed to ensure a fluid barrier along the pipe connection after assembly by welding.

9 Claims, 1 Drawing Sheet

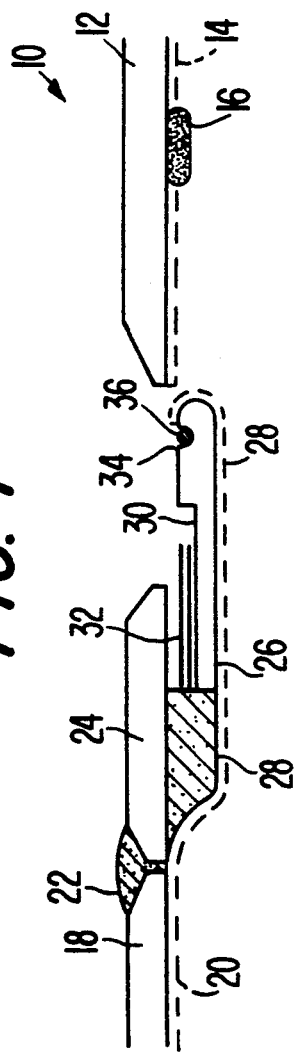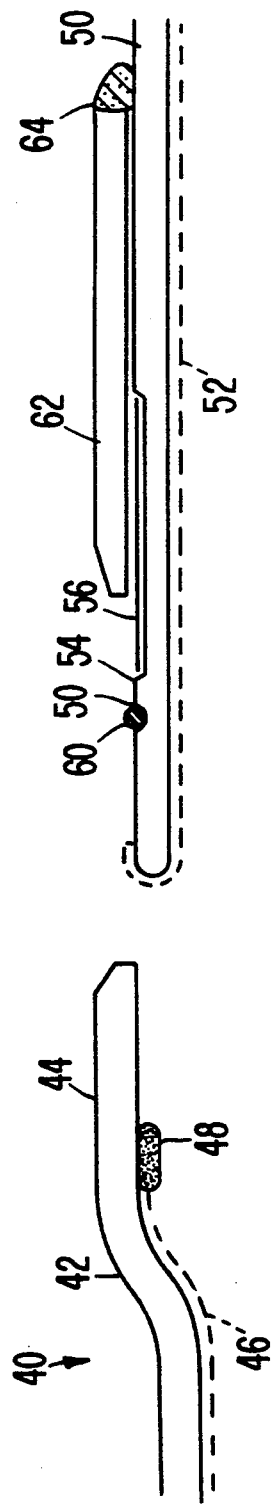

PIPE CONNECTION

BACKGROUND OF THE INVENTION

1. Field of the Invention

The invention relates to a pipe connection having a continuous interior surface coating thereon.

2. Description of the Prior Art

With pipe connections used in the oil industry, it is necessary that the connection as well as the associated pipes have a coating resistant to corrosion that is continuous on the interior surface thereof. Although pipe of this type may be readily coated with a suitable corrosion-resistant material, it is difficult to maintain this corrosion resistant coating continuous during welding operations incident to the formation of pipe connections. During welding the heat generated in the weld-affected zone causes deterioration of interior corrosion-resistant coatings of conventional pipe connections.

SUMMARY OF THE INVENTION

It is accordingly a primary object of the present invention to provide a pipe connection having a continuous interior surface coating thereon, which coating may be maintained without damage during welding operations incident to forming the pipe connection.

In accordance with the invention, the pipe connection thereof has an annular sleeve connected and sealed by welding at one end thereof to a surface of a first pipe. An end of a second pipe is connected to the first pipe by a welded connection. Heat deflecting material is provided to extend along the welded connection. Mating, coacting means provide a fluid barrier at an interior surface of one of the first and second pipes. The barrier prevents fluid replenishment through the pipe connection between the annular sleeve and the surface of the pipe to which it is connected. A continuous interior surface coating is maintained on the pipe connection. This coating may be of any conventional type that provides corrosion resistance, abrasion resistance or a combination thereof.

The pipe connection may have an annular sleeve connected and sealed by welding at an end thereof to a surface of a first pipe with an extending portion of the annular sleeve extending beyond an end of this first pipe. A second pipe has an end thereof welded to the end of the first pipe with the extending portion of the sleeve being in contact with a surface portion of this second pipe. Heat deflecting material extends circumferentially along the extending portion of the sleeve at the welded ends of the first and second pipes. Mating, coacting means are provided on contacting portions of the second pipe and the extending portion of the sleeve to provide a mastic barrier at these contacting portions. A continuous interior surface coating is provided on the pipe connection.

The annular sleeve may be connected to an interior surface of the first pipe.

The extending portion of the sleeve may have an annular relieved area within which the heat deflecting material is mounted.

The mating, coacting means may be compressed mastic material extending continuously and circumferentially along the contacting portions of the second pipe and the extending portion of the sleeve. The mating, coacting means may include an O-ring mounted in a continuous notch in the contacting portion of the extending portion of the sleeve.

The first and second pipes may be of the same diameter, with the diameter of each being uniform along an entire length thereof.

The pipe connection may have an annular sleeve connected to an exterior surface of a first pipe with the annular sleeve being offset from an end of this first pipe. A second pipe has an enlarged diameter portion welded at an end thereof to an end of the annular sleeve proximate to the end of the first pipe. The enlarged diameter portion of the second pipe has an interior surface portion contacting an exterior surface portion of the first pipe. Heat deflecting material extends circumferentially about the first pipe at the welded ends of the enlarged diameter portion and the annular sleeve. Mating, coacting means are provided on the interior surface portion and the exterior surface portion to provide a fluid barrier therebetween. A continuous interior surface coating is provided on the pipe connection.

An annular relieved area may be provided in the first pipe with the heat deflecting material mounted therein.

The mating, coacting means may be compressed mastic material extending continuously and circumferentially along the contacting exterior surface portion and the interior surface portion.

The mating, coacting means may include an O-ring mounted in a continuous notch in the exterior surface portion.

BRIEF DESCRIPTION OF THE DRAWINGS

FIG. 1 is sectional view of one embodiment of a pipe connection in accordance with the invention; and FIG. 2 is a view similar to FIG. 1 of an alternate embodiment of the invention.

DESCRIPTION OF THE PREFERRED EMBODIMENTS

With reference to the drawings, and for the present to FIG. 1 thereof, one embodiment of a pipe connection in accordance with the invention is designated generally as 10. The pipe connection includes a pipe 12 having a continuous, interior surface coating 14. An annular ring of compressible material 16 is also provided on the interior of the pipe 12. A second pipe 18 having a coating 20 of like material, is welded at 22 to a pipe section 24 of identical diameter. The pipe section 24 has an annular sleeve 26 welded to the interior surface thereof at 28. The sleeve 26 has an interior, continuous coating 28 of the same material as coatings 16 and 20. An annular relieved area 30 is provided on the sleeve 26. Heat deflecting material 32 is mounted within the relieved area 30. A notch 34 is provided near the end of the sleeve 26 and a compressible O-ring 36 is mounted in this notch.

During assembly of the connection 10, the ends of the pipes 12 and 18 are brought into contact and welded at these ends in the conventional manner. With the connection 10 in this position, the heat deflecting material 32 in the relieved area 30 protects the coating 28 from damage caused by heat incident to welding. In addition, with the pipe connection 10 in this position the compressible material 16 and the O-ring 36 are in compressing engagement to provide a fluid barrier. This fluid barrier in conjunction with the welded sleeve 26 prevents fluid, such as petroleum products and water, flowing through the pipe connection from flowing between the sleeve 26 and the pipe section 24.

Consequently, with the pipe connection as shown in FIG. 1 and described above, a continuous interior coating is maintained after welding to provide the desired resistance to corrosion and/or abrasion. Likewise, a tight fluid barrier is maintained across the pipe connection.

In the embodiment of FIG. 2, the pipe connection is designated generally as 40. The pipe connection includes a pipe 42 having a belled or enlarged diameter end portion 44. The pipe 42 includes an interior coating 46 terminating at a ring of compressible material 48 offset from the belled end of the tubing. A second pipe 50 is provided with a like continuous interior coating 52. An annular relieved area 54 is provided on the pipe 50 within which heat deflecting material 56 is mounted. An annular notch 58 is provided in the pipe 50 in which O-ring 60 is mounted. An end of annular sleeve 62 is welded at 64 to the outside surface of the pipe 50. An opposite end of the annular sleeve 62 terminates within the relieved area 54. If the belled end of pipe 42 is brought into contact with the end of sleeve 62 extending within the relieved area 54 and welded in the conventional manner, as with the embodiment described with regard to FIG. 1, the heat deflecting material 56 protects the interior coatings from damage and the mating of compressible material 48 and O-ring 60 provides a barrier to inhibit fluid, such as petroleum products, flowing through the connection from entering between the sleeve 62 and the pipe 50.

The compressible material may be a chemically reacted polymeric mastic. The O-ring may be any suitable rubber type material. The interior coatings on the pipe may be selected to provide the type protection required depending upon the media to which the pipe will be subjected during use. Typically, corrosion resistant and/or abrasion resistant coatings are used, such as phenolic, epoxy and nylon. The heat deflecting material may be asbestos cloth which is wrapped within the annular notch provided in either the annular sleeve or the surface of the pipe in accordance with the embodiments of FIG. 1 and FIG. 2, respectively.

With the pipe connection in accordance with both the embodiments of FIG. 1 and FIG. 2, make-up and welding may be achieved in the field without requiring complex equipment or procedures, while maintaining both a fluid barrier and the integrity of the interior protective coating along the entire pipe connection.

What is claimed is:

1. A pipe connection comprising, an annular sleeve connected and sealed by welding at an end thereof to a surface of a first pipe with an extending portion of the sleeve extending beyond an end of said first pipe, a second pipe having an end thereof welded to said end of said first pipe with said extending portion of the sleeve being in contact with a surface portion of said second pipe, heat deflecting material extending circumferentially along said extending portion of the sleeve at the welded ends of said first and second pipes and within a relieved area provided in a surface of said sleeve, mating, coacting means on contacting portions of said second pipe and the extending portion of said sleeve for providing a fluid barrier at said contacting portions and a continuous interior surface coating on said pipe connection.

2. The pipe connection of claim 1 wherein, said annular sleeve is connected to an interior surface of said first pipe.

3. The pipe connection of claim 2 wherein, said mating, coacting means includes compressed mastic material extending continuously and circumferentially along the contacting portions of said second pipe and the extending portion of said sleeve.

4. The pipe connection of claim 3 wherein, said mating, coacting means includes an O-ring mounted in a continuous notch in said contacting portion of said extending portion of said sleeve.

5. The pipe connection of claim 2 wherein, said first and second pipes are of the same diameter with the diameter of each being uniform along an entire length thereof.

6. A pipe connection comprising, an annular sleeve connected to an exterior surface of a first pipe and being offset from an end of said first pipe, a second pipe having an enlarged diameter portion welded at an end thereof to an end of said annular sleeve proximate to said end of said first pipe, with said enlarged diameter portion having an interior surface portion contacting an exterior surface portion of said first pipe; heat deflecting material extending circumferentially about said first pipe at the welded ends of said sleeve and said enlarged diameter portion of said second pipe, mating, coacting means on said interior surface portion and said exterior surface portion for providing a fluid barrier at said contacting portions and a continuous interior surface coating on said pipe connection.

7. The pipe connection of claim 6 wherein, an annular relieved area is provided in said exterior surface portion of said first pipe with said heat deflecting material mounted therein.

8. The pipe connection of claim 7 wherein, said mating, coating means includes compressed mastic material extending continuously and circumferentially along said contacting exterior surface portion and the interior surface portion.

9. The pipe connection of claim 8 wherein, said mating, coacting means includes an O-ring mounted in a continuous notch in said exterior surface portion.

* * * * *